United States Patent
Denman et al.

(10) Patent No.: US 8,773,981 B2
(45) Date of Patent: Jul. 8, 2014

(54) SYSTEMS AND METHODS FOR DYNAMIC CONGESTION MANAGEMENT IN COMMUNICATIONS NETWORKS

(75) Inventors: Robert E. Denman, Plano, TX (US); Frederick C. Kemmerer, Hollis, NH (US)

(73) Assignee: Genbrand US LLC, Frisco, TX (US)

( * ) Notice: Subject to any disclaimer, the term of this patent is extended or adjusted under 35 U.S.C. 154(b) by 145 days.

(21) Appl. No.: 13/312,436

(22) Filed: Dec. 6, 2011

(65) Prior Publication Data

US 2012/0140624 A1 Jun. 7, 2012

Related U.S. Application Data

(60) Provisional application No. 61/420,272, filed on Dec. 6, 2010.

(51) Int. Cl.
H04L 12/26 (2006.01)

(52) U.S. Cl.
USPC .......................................... 370/229

(58) Field of Classification Search
USPC ........................ 370/229, 230, 235
See application file for complete search history.

(56) References Cited

U.S. PATENT DOCUMENTS

| | | | |
|---|---|---|---|
| 6,882,709 B1 | 4/2005 | Sherlock et al. | |
| 7,636,578 B1 | 12/2009 | Cope et al. | |
| 7,694,127 B2 | 4/2010 | Adams et al. | |
| 7,903,661 B2 | 3/2011 | Biswas et al. | |
| 2003/0023774 A1* | 1/2003 | Gladstone et al. | 709/328 |
| 2006/0085832 A1 | 4/2006 | Groff et al. | |
| 2006/0239255 A1 | 10/2006 | Ramachandran et al. | |
| 2007/0067264 A1* | 3/2007 | Froehlich et al. | 707/3 |
| 2008/0104630 A1 | 5/2008 | Bruce et al. | |
| 2008/0108348 A1 | 5/2008 | Kottilingal et al. | |
| 2008/0159136 A1 | 7/2008 | Mallesan | |
| 2008/0162720 A1 | 7/2008 | Gulati et al. | |
| 2008/0168503 A1 | 7/2008 | Sparrell | |
| 2009/0003315 A1 | 1/2009 | Devdhar et al. | |
| 2009/0232001 A1* | 9/2009 | Gong et al. | 370/236 |
| 2010/0017506 A1* | 1/2010 | Fadell | 709/224 |
| 2012/0039175 A1* | 2/2012 | Sridhar et al. | 370/236 |

OTHER PUBLICATIONS

Related application: Subhra Saha et al.; Adaptive Intelligent Optimal Registration Interval Determination Algorithm Ensuring High Availability, filed Dec. 29, 2008 as U.S. Appl. No. 61/141,008.
Related application: Robert Denman et al.; Systems and Methods for Enabling Personalization of Data Service Plans filed Nov. 16, 2010 as U.S. Appl. No. 61/414,272.

(Continued)

*Primary Examiner* — Raj Jain
*Assistant Examiner* — Zhiren Qin
(74) *Attorney, Agent, or Firm* — Haynes and Boone, LLP (57) ABSTRACT

Systems and methods for dynamic congestion management in communications networks are disclosed herein. According to an aspect, a method can include determining traffic statistics of at least one node in a communications network. The method can also include determining whether the at least one node is congested based on the traffic statistics. Further, the method can include dynamically changing or provisioning a set of at least one traffic shaping rule for application to the at least one node in response to determining that the at least one node is congested.

28 Claims, 9 Drawing Sheets

(56) References Cited

OTHER PUBLICATIONS

Related application: Nalin Mistry et al.; Integrating Telephony Applications and Television Broadcasts on a Multimedia Device filed May 16, 2008 as U.S. Appl. No. 61/053,782.
Related application: Robert Denman et al.; Systems and Methods for Dynamic Congestion Management in Communications Networks filed Dec. 6, 2010 as U.S. Appl. No. 61/420,272.
Related application: Frederick Kemmerer et al.; Systems and Methods for Intelligent Network Edge Traffic and Signaling Management filed Mar. 3, 2011 as U.S. Appl. No. 61/449,068.
Related application: Subhra Saha et al.; Adaptive Intelligent Optimal Registration Interval Determination Algorithm Ensuring High Availability, filed Mar. 14, 2009 as U.S. Appl. No. 12/404,286, now issued as U.S. Patent No. 7,945,663 on May 17, 2011.
Related application: Robert Denman et al.; Systems and Methods for Enabling Personalization of Data Service Plans, filed Aug. 31, 2011 as U.S. Appl. No. 13/222,807.
Gill, Phillipa et al., "YouTube Traffic Characterization: A View From the Edge", IMC '07, Oct. 24-26, 2007, San Diego, California, USA, 14 pages.
"Amdocs Policy Controller/PCRF" found at <http://www.bridgewatersystems.com/Policy-Controller.aspx> copyright 1996-2009, Bridgewater Corporation, printed Jan. 16, 2012, 2 pages.
"Bytemobile—Reduce Data Traffic—Lossy Media Optimization" found at <http://archive.org/web/2010102605027/http://bytemobile.com/products-applications/mfs-lossy-media-optimization.html>, on the Internet archive, copyright 2010, Bytemobile, Inc., printed Jan. 16, 2012, 1 page.
"Genband: Traffic & Policy Management" found at <http://genband.com/products/traffic-policy-management.com>, copyright 2012 Genband, printed Jan. 16, 2012, 1 page.
"MDX 9000 Series Media Distribution Switch", found at <http://web.archive.org/web/20100731024602/http://verivue. com/products-verivue-media-distribution-platform-content-distribution-switch.asp>, on the Internet archive, copyright 2010, Verivue, Inc., printed Jan. 16, 2012, 1 page.
"Putting Policy Control to Work", found at <http://www.fiercewireless.com/story/putting-policy-control-work/2010-09-27-0>, copyright 2011, FierceMarkets, printed Jan. 16, 2012, 3 pages.
Related application: Nalin Mistry et al.; Integrating Telephony Applications and Television Broadcasts on a Multimedia Device, filed Dec. 9, 2008 as U.S. Appl. No. 12/330,899.
Corresponding non-final Office Action and accompanying PTO-892 mailed Jan. 26, 2012 for related U.S. Appl. No. 12/330,899 listed above.
Corresponding Applicant's response filed Feb. 20, 2012 to Jan. 26, 2012 Office Action for related U.S. Appl. No. 12/330,899 listed above.
Related application: Robert Denman et al.; Systems and Methods for Dynamic Congestion Management in Communications Networks filed Dec. 6, 2011 as U.S. Appl. No. 13/312,436.
Related application: Kemmerer et al.; Systems and Methods for Intelligent Network Edge Traffic and Signaling Management filed Mar. 5, 2012 as U.S. Appl. No. 13/412,007.
Related application: Dany Sylvain et al.; Methods, Systems, and Computer Readable Media for Deriving User Availability From User Context and User Responses to Communications Requests filed Jul. 12, 2011 as U.S. Appl. No. 13/180,577.
Related application: Subhra Saha et al.; Adaptive Intelligent Optimal Registration Interval Determination Algorithm Ensuring High Availability filed Dec. 18, 2009 as PCT/US09/68723 and published as WO 2010/078076 on Jul. 8, 2010.
Written Opinion/ISR dated Aug. 3, 2010 for related application PCT/US09/68723 filed Dec. 18, 2009.
J. Lin, The multi-agent rendezvous problem—Part I, Journal on Control and Optimization, 2005.
Venkat Anantharam et al., IEEE Trans on comm., Burst Reduction Properties of the Leaky Bucket Flow Control Scheme in ATM Networks, Dec. 1994, vol. 42, No. 12.
Related Chinese application: CN 200910215530.7 filed Dec. 28, 2009, now abandoned. (Based on U.S. Appl. No. 61/141,08 and U.S. Appl. No. 12/404,286.).

\* cited by examiner

SYSTEMS AND METHODS FOR DYNAMIC CONGESTION MANAGEMENT IN COMMUNICATIONS NETWORKS

CROSS REFERENCE TO RELATED APPLICATION

The present application claims priority to the commonly owned U.S. Provisional Patent Application No. 61/420,272, titled SYSTEMS AND METHODS FOR DYNAMIC CONGESTION MANAGEMENT IN COMMUNICATIONS NETWORKS and filed Dec. 6, 2010, which is incorporated herein by reference in its entirety.

TECHNICAL FIELD

The presently disclosed subject matter relates to communications networks. Particularly, the presently disclosed subject matter relates to dynamic congestion management in communications networks.

BACKGROUND

During times of communications network congestion, subscribers using more than their fair share of bandwidth can impact the quality of experience (QoE) of all active subscribers. In addition, certain applications may unnecessarily consume a large portion of bandwidth during times of congestion, thereby impacting the responsiveness and QoE for more interactive applications. These problems may exist even where traffic and policy management (TPM) systems have been deployed.

Provisioning of deep packet inspection (DPI)-enabled traffic management policies to address data network congestion is often an imprecise, iterative science: policies are statically provisioned, results are observed, conclusions drawn regarding the need for further policy changes, and the cycle may then begin again. When congestion occurs despite enforcement of policies currently in place, manual provisioning of policy changes may be required; but this often occurs after the congestion has passed or, at best, with some delay in response to an alarm being raised. Sometimes it is the reoccurring pattern of network congestion that predicates manual provisioning changes, but the network operations staff must first recognize the pattern and assess what changes are needed.

Accordingly, there is a continuing need for improving systems and methods for congestion management in communications networks.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Disclosed herein are systems and methods for dynamic congestion management in communications networks. According to an aspect, systems and methods disclosed herein may, during times of congestion, dynamically limit bandwidth usage of subscribers using more than their fair share of bandwidth. Such congestion management may be dynamically or automatically implemented so as to address congestion at various points in a network hierarchy.

According to an aspect, a method can include determining traffic statistics of at least one node in a communications network. The method can also include determining whether the at least one node is congested based on the traffic statistics. Further, the method can include dynamically changing or provisioning a traffic shaping rule for application to the at least one node in response to determining that the at least one node is congested.

The presently disclosed subject matter provides: automated detection and mitigation of network congestion by dynamic provisioning of DPI-enabled traffic management policies, so as to address network congestion events in a more timely fashion; and automated evaluation of (possibly repeated) dynamic policy changes and their effectiveness, so as to expedite the provisioning of any necessary, corresponding statically provisioned policies that may mitigate future congestion events in real time.

BRIEF DESCRIPTION OF THE DRAWINGS

The foregoing summary, as well as the following detailed description of preferred embodiments, is better understood when read in conjunction with the appended drawings. For the purposes of illustration, there is shown in the drawings exemplary embodiments; however, the presently disclosed subject matter is not limited to the specific methods and instrumentalities disclosed. In the drawings.

DETAILED DESCRIPTION

The presently disclosed subject matter is described with specificity to meet statutory requirements. However, the description itself is not intended to limit the scope of this patent. Rather, the inventors have contemplated that the claimed subject matter might also be embodied in other ways, to include different steps or elements similar to the ones described in this document, in conjunction with other present or future technologies. Moreover, although the term "step" may be used herein to connote different aspects of methods employed, the term should not be interpreted as implying any particular order among or between various steps herein disclosed unless and except when the order of individual steps is explicitly described.

Figure 1:
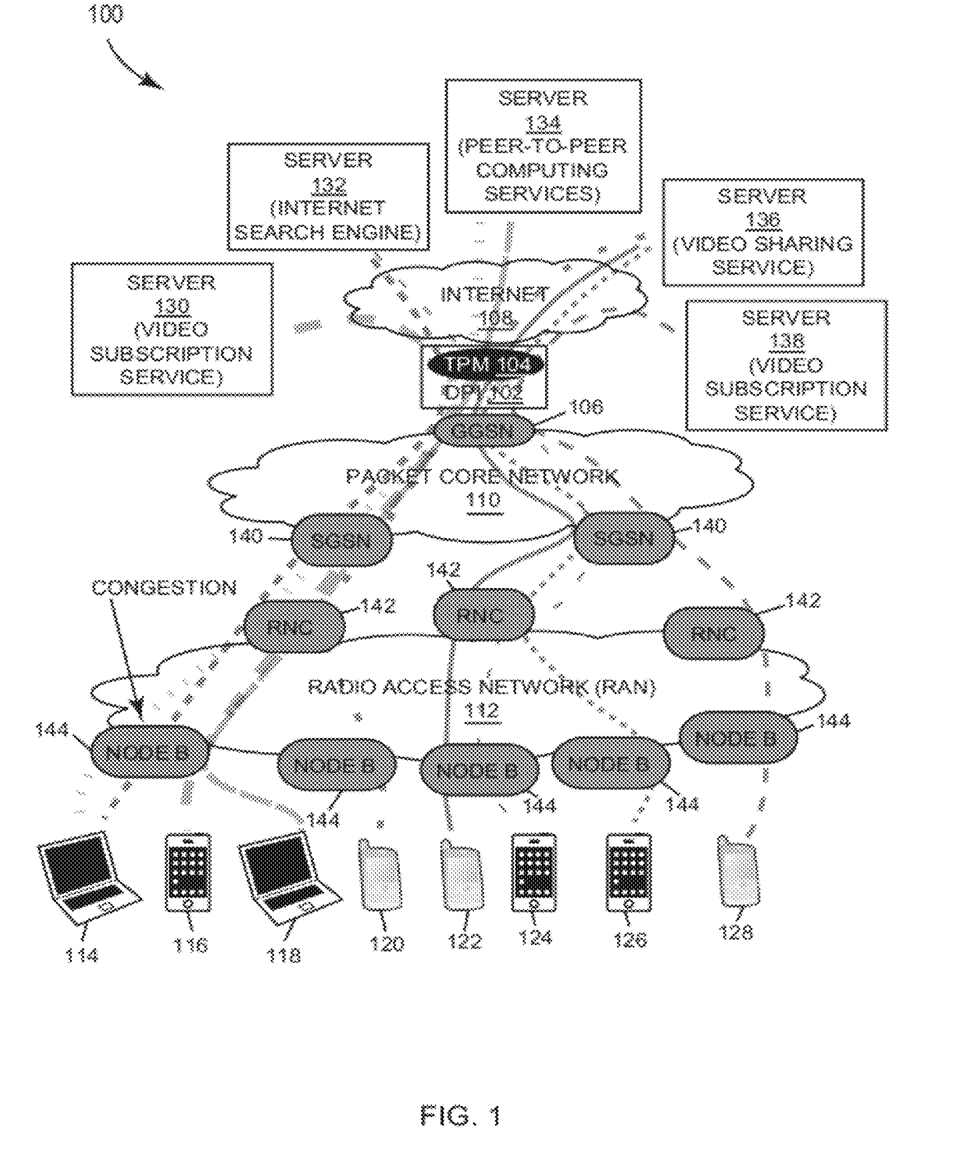
FIG. 1 is a block diagram of an exemplary communications network 100 in which the presently disclosed subject matter may be deployed for dynamic congestion management in accordance with embodiments of the present disclosure.

FIG. 1 illustrates a block diagram of an exemplary communications network 100 in which the presently disclosed subject matter may be deployed for dynamic congestion management in accordance with embodiments of the present disclosure. Referring to FIG. 1, a DPI module 102 having a TPM function 104 is deployed behind a GGSN 106 on Gi (GGSN-to-PDN (public data network) interface). In this example, the TPM policy of the TPM function 104 is not controlled by a policy, charging, and rules function (PCRF). Various embodiments for dynamically managing congestion at one or more nodes in accordance with the present disclosure may be implemented by the TPM function 104 of the DPI module 102; however, any other suitable function of another suitable device or component may be used for dynamically managing congestion at one or more nodes.

In this example, the network 100 includes various other communications networks such as, but not limited to, the Internet 108, a packet core network 110, and a radio access network (RAN) 112. Computing devices 114-128 may utilize the Internet 108, the packet core network 110, and the RAN 112 for accessing various computing services or content. For example, the Internet 108 may be communicatively connected to servers 130-138 that are configured to provide computing services to devices such as the computing devices 114-128. For example, the server 130 may provide a video subscription service, the server 132 may provide an Internet search service, the server 134 may provide a peer-to-peer file-transfer service, the server 136 may provide a video sharing service, and the server 138 may provide a video subscription service.

Network traffic between the computing devices 114-128 and the servers 130-138 may be managed and handled by nodes of the Internet 108, the packet core network 110, and the RAN 112. For example, the Internet may include various network nodes for handling the transmission of data between the servers 130-138 and the GGSN 106. The packet core network 110 may include network nodes for handling the transmission of data between the GGSN 106 and serving GPRS support nodes (SGSNs) 140, which may communicate with radio network controllers (RNCs) 142 for the transmission of data. Further, the RAN 112 may include backhaul network nodes for handling the transmission of data between the RNCs 142 and NodeBs 144. Each RNCs 142 is configured to control one or more NodeBs 144 that are connected to it. These networks and nodes may be targeted for dynamic congestion management of network traffic between the computing devices 114-128 and the servers 130-138 or other components in the network 100 in accordance with embodiments of the present disclosure.

It is noted that examples described herein involve a mobile communications network; however, any other suitable communications network may be used to implement system and method embodiments of the presently disclosed subject matter. For example, the presently disclosed subject matter may also be applied to fixed broadband (e.g., DSL technologies (xDSL), fiber-to-the-home (FTTH), and the like), cable networks, or any other suitable type of communications network.

As referred to herein, the term "computing device" should be broadly construed. It can include any type of device capable of communicating with other devices, network nodes, and/or networks. For example, a computing device may be a mobile device such as, for example, but not limited to, a smart phone, a feature (cell) phone, a pager, a personal digital assistant (PDA), a tablet, a mobile computer, or some other device with a wireless or cellular network interface card (NIC). A computing device can also include any type of conventional computer, for example, a desktop computer or a laptop computer. A typical mobile computing device is a wireless data access-enabled device (e.g., an iPHONE® smart phone, a BLACKBERRY® smart phone, a NEXUS ONE™ smart phone, an iPAD® device, or the like) that is capable of sending and receiving data in a wireless manner using protocols like the Internet Protocol, or IP, or the wireless application protocol, or WAP. This allows users to access information via wireless devices, such as smart phones, mobile phones, pagers, two-way radios, communicators, and the like. Wireless data access is supported by many wireless networks, including, but not limited to, CDPD, CDMA, GSM, PDC, PHS, TDMA, FLEX, ReFLEX, iDEN, TETRA, DECT, DataTAC, Mobitex, EDGE, UMTS, HSPA, WiMAX, LTE, LTE Advanced, and other 2G, 3G and 4G technologies, and it operates with many handheld device operating systems, such as PalmOS, EPOC, Windows CE, FLEXOS, OS/9, JavaOS, iOS and Android. Typically, these devices use graphical displays and can access the Internet (or other communications network) on so-called mini- or micro-browsers, which are web browsers optimized for small displays and which may accommodate the reduced memory constraints of many wireless devices. In a representative embodiment, the mobile device is a cellular telephone or smart phone that operates over GPRS, which is a data technology for GSM networks. In addition to a conventional voice communication, a given mobile device can communicate with another such device via many different types of message transfer techniques, including SMS (short message service), enhanced SMS (EMS), multi-media message (MMS), email WAP, paging, or other known or later-developed wireless data formats. Although many of the examples provided herein are implemented on smart phones, the examples may similarly be implemented on any suitable electronic device, such as a computer.

Figure 2:
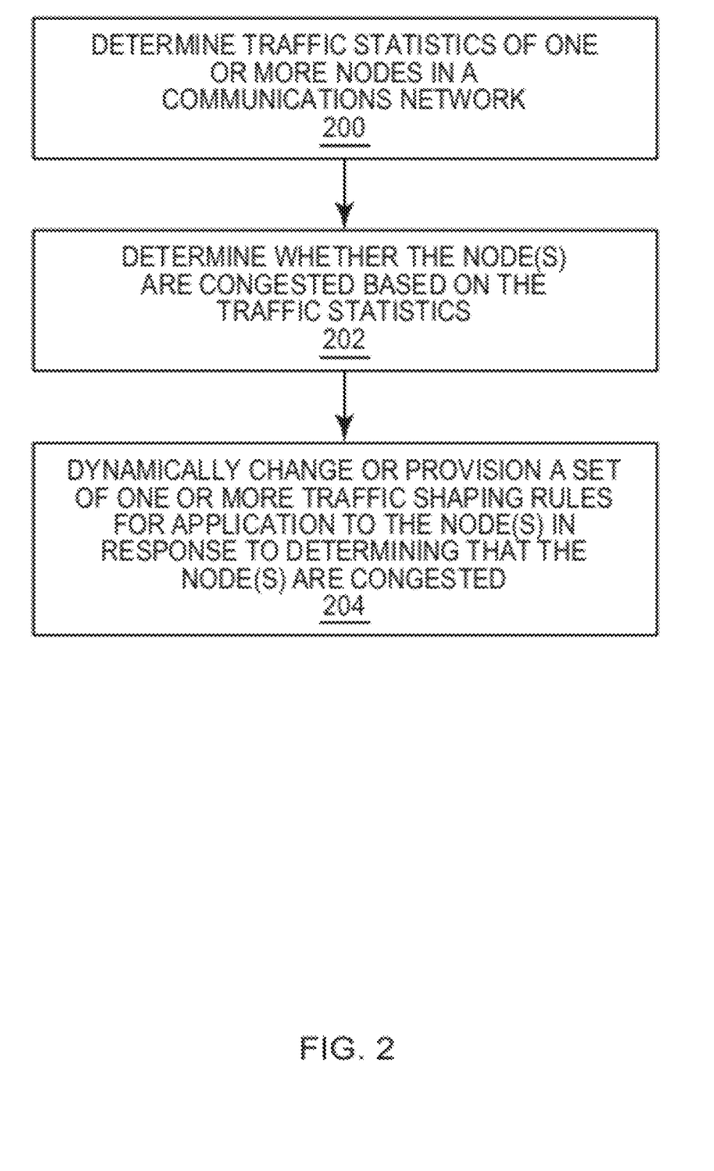
FIG. 2 is a flowchart of an example method for dynamic congestion management in accordance with embodiments of the present disclosure.

FIG. 2 illustrates a flowchart of an example method for dynamic congestion management in accordance with embodiments of the present disclosure. This method may be implemented, for example, by the TPM function 104 of the system 100 shown in FIG. 1 during times of network traffic congestion, for periodically and dynamically augmenting traffic-management policies. In another example, this method may be partially or entirely automated by the systems and devices described herein. In an example, this method may be implemented by any suitable component or node, such as a DPI system, configured for dynamic provisioning of congestion management policies as disclosed herein. It is noted that the DPI module may be implemented by one or more other components such as, but not limited to, a DPI engine, a statistics storage unit, and a subscriber manager. In one embodiment, described below, the subscriber manager may associate user identities, serving network nodes and device types with the IP addresses of computing devices.

Referring to FIG. 2, the method includes determining traffic statistics of one or more nodes in a communications network (step 200). For example, the TPM function 104 of the DPI module 102 may determine traffic statistics including, but not limited to, a QoE score for the aggregate of one or more computing devices being served by a given network node, such as computing devices 114, 116, and 118 served by NodeB 144. The QoE score, for example, may be derived from detected packet drops and retransmissions occurring in the context of Transmission Control Protocol (TCP) connections with computing devices 114, 116, and 118. As an alternative or in addition to determining an aggregate QoE score for NodeB 144, TPM function 104 may determine at least one of aggregate nodal downlink bandwidth, aggregate nodal uplink bandwidth, or aggregate nodal downlink and uplink bandwidth of traffic exchanged with computing devices 114, 116, and 118. Collecting statistics for nodal QoE scores, or for nodal aggregate bandwidth may prove useful in subsequently inferring nodal congestion.

Additional statistics may be collected for possible use in deriving policies to manage nodal congestion. For example, nodal bandwidth statistics may be collected per user, per application, per device, or per some combination of the preceding. For example, nodal bandwidth statistics may be collected per application per user.

The method of FIG. 2 includes determining whether the node(s) are congested based on the traffic statistics (step 202). For instance, TPM function 104 may determine that one of the NodeBs 144 is congested as depicted in FIG. 1. Continuing an aforementioned example, the TPM function 104 may determine that the node's aggregate QoE score is falls below a predefined threshold, and thereby ascertains that the node is likely congested. In another example, the TPM function 104 may assess the aggregate bandwidth of traffic exchanged with computing devices served by a network node against an engineered link capacity for this node. Such an engineered capacity is hereinafter referred to as a link-utilization threshold. If the aggregate bandwidth exceeds a provisioned, nodal, link-utilization threshold, TPM function 104 may infer that the node is congested.

The method of FIG. 2 includes dynamically changing or provisioning a set of one or more traffic shaping rules for application to the node(s) in response to determining that the node(s) are congested. For example, the TPM function 104 may dynamically change or provision a traffic shaping rule for application to the congested nodeB 144 in response to determining that the nodeB is congested. The traffic shaping rules applied to manage nodal congestion may vary in consideration of at least one of service plans associated with users that are served by the congested node, limitations on congestion management permitted by the regulatory environment in which the node resides, and operator-specific policies. For example, where users subscribe to service plans that are tiered on the basis of allowed bandwidth or traffic volume, TPM function 104 may shape nodal traffic of lower-tier (e.g., "bronze") users per their service plan before iteratively impacting the traffic of higher-tier (e.g., "silver" and "gold") users. Or where a user is served by the congested node and subscribes to a plan offering a premium gaming or voice over internet protocol (VoIP) experience, TPM function 104 may selectively throttle other traffic to ensure that the user enjoys an optimal gaming or VoIP experience. In another embodiment, where "net neutrality" concerns do not prohibit targeting specific applications, TPM function 104 may during nodal congestion shape traffic of applications which do not directly contribute to the network operator's revenues, in order to provide a better QoE for applications which do contribute to the operator's revenues. Another example would be TPM function 104 shaping traffic of applications which are less sensitive to delay or packet loss, in order to provide a better QoE for users of applications which are more sensitive. For instance, TPM function 104 may shape peer-to-peer (P2P) and other file-transfer traffic, as well as downloads of software updates, in order to provide other users with a better VoIP and web browsing experience. Yet another example would be TPM function 104 applying traffic-shaping rules to drop packets of high-definition (HD), streamed video to computing devices with low-resolution displays, so as to trigger feedback from the computing device to the video head-end, such that lower-definition video is streamed because of network congestion being assumed by the end points. Where "net neutrality" concerns do prohibit targeting specific applications, TPM function 104 may enforce "usage fairness" traffic-shaping policies that are application-agnostic but which effectively target users that use more than their "fair share" of bandwidth during nodal congestion, so as to limit the detrimental impact of such "bandwidth abusive" users on other users' QoE.

Figure 3:
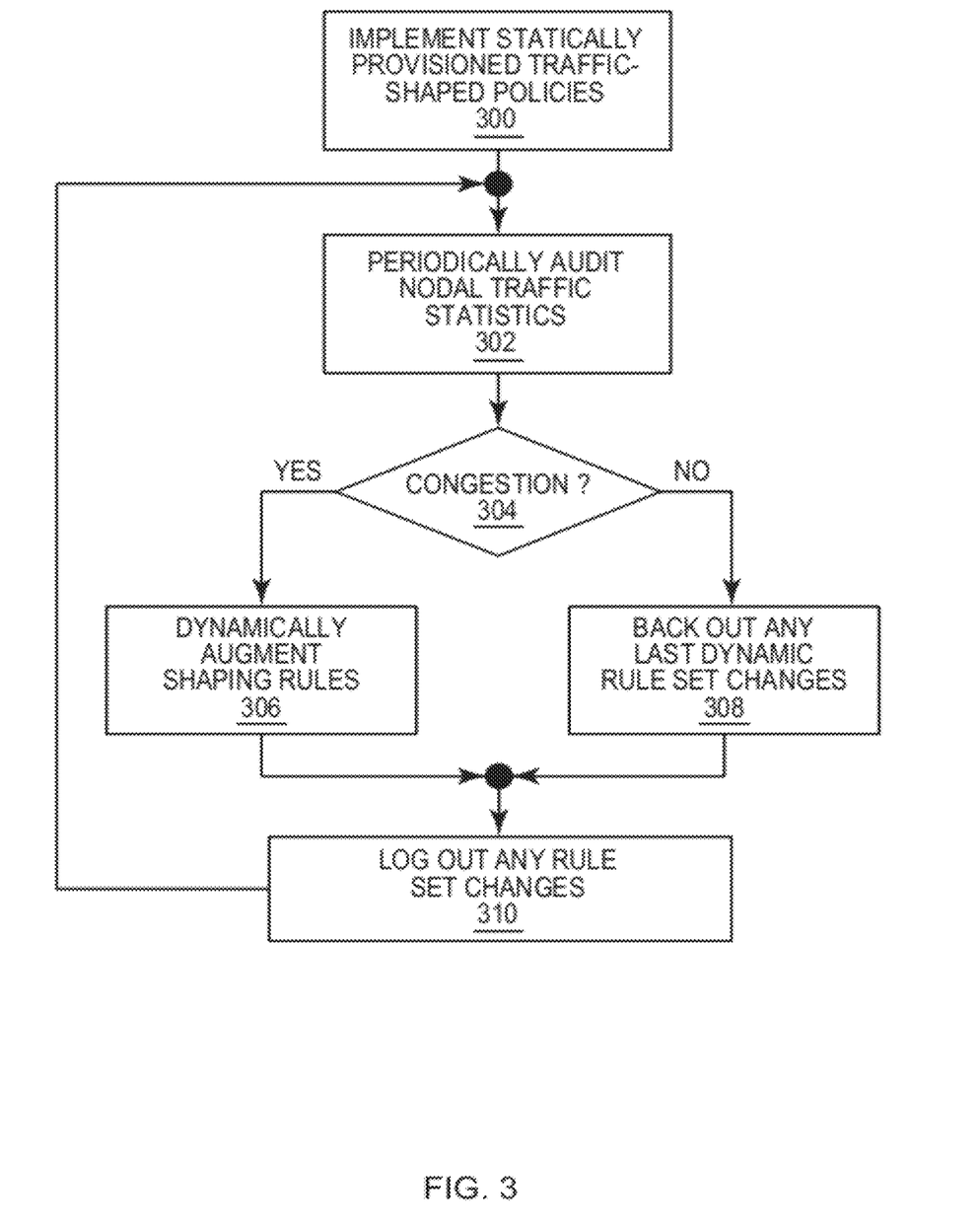
FIG. 3 is a flowchart of another example method for dynamic congestion management in accordance with embodiments of the present disclosure.

FIG. 3 illustrates a flowchart of another example method for dynamic congestion management in accordance with embodiments of the present disclosure. This method may be implemented, for example, by the TPM function 104 of the system 100 shown in FIG. 1 during times of network traffic congestion for periodically and dynamically augment traffic-management policies. In another example, this method may be partially or entirely automated by the systems and devices described herein. In an example, this method may be implemented by any suitable component or node, such as a DPI system, configured for dynamic provisioning of congestion management policies as disclosed herein.

Referring to FIG. 3, the method includes implementing statically provisioned, baseline traffic-shaping policies (step 300). For example, the TPM function 104 shown in FIG. 1 may implement a baseline traffic management policy such as, but not limited to, one of the following: ensuring that downlink traffic's bandwidth does not exceed the network's engineered downlink bandwidth capacity, dropping (policing) traffic associated with illegal peer-to-peer file sharing, or prioritizing premium (e.g., "gold") users' traffic over others' traffic.

The method of FIG. 3 includes periodically auditing nodal traffic statistics (step 302). For example, the TPM function 104 may audit nodal traffic statistics every 15 minutes as described for step 202 of FIG. 2. For instance, every 15 minutes TPM function 104 may examine nodal aggregate QoE scores or the aggregate traffic bandwidth supported by network nodes.

The method of FIG. 3 includes determining whether there is nodal congestion (step 304). For example, as described for step 202 of FIG. 2, TPM function 104 may assess whether nodal aggregate QoE scores have fallen below a provisioned QoE threshold, or whether aggregate traffic bandwidth exceeds a nodal link-utilization or throughput-capacity threshold. For congested nodes, problematic users and applications may be identified.

In response to determining that there is nodal congestion at step 304, the method may dynamically augment or provision shaping rules or policies for congested nodes (step 306). Such rules or policies may selectively throttle any combination of users, applications, nodal bandwidth usage, and device types. For example, TPM function 104 may apply traffic-shaping policies, such as those described for step 204 of FIG. 2. Policies may be applied to congested nodes at a lowest level in a network hierarchy that is experiencing congestion, since addressing congestion at lower-level nodes may alleviate congestion at nodes higher in the network hierarchy.

In response to determining that there is no longer congestion at a node to which shaping rules or policies were dynamically applied, the method may back out any last dynamic rule set changes (step 308). As expounded in connection with FIG. 8, hysteresis techniques may be employed to minimize "ping ponging" between congested and uncongested nodal states.

At step 310, the method may log any dynamic rule set changes. Telecommunications products often support time-stamped logging of various system events, including provisioning changes. TPM function 104 may augment an existing log to record dynamic provisioning of traffic-management policies, accounting for both their application to congested nodes and their disablement or removal from network nodes that are no longer congested. Logging of dynamic policy changes related to congested nodes, together with collection of nodal traffic statistics, allows subsequent analysis of patterns in and effectiveness of these dynamic, congestion-management policies.

Figure 4:
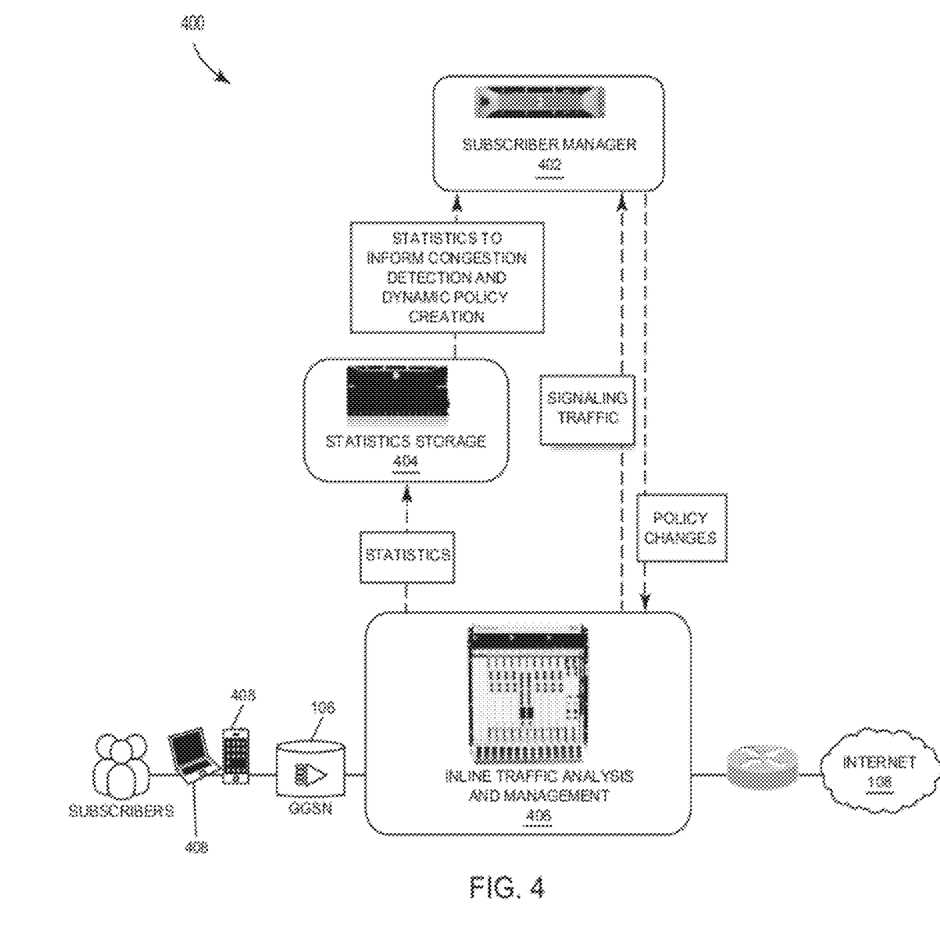
FIG. 4 is a block diagram of an example system for dynamic congestion management in accordance with an embodiment of the present disclosure.

FIG. 4 illustrates a block diagram of an example system 400 for dynamic congestion management in accordance with an embodiment of the present disclosure. Referring to FIG. 4, the system 400 may include a subscriber manager 402, a statistics storage unit 404, and a DPI engine 406 configured for inline traffic analysis and management. These components may be operable together for implementing dynamic congestion management in accordance with embodiments of the present disclosure. For example, the DPI engine 406 may be positioned behind a GGSN 408 and may manage traffic between one or more subscriber computing devices 408 and the Internet 410. Further, the DPI engine 406 may provide inline traffic classification—e.g., identify the applications associated with traffic flows—and correlate traffic flows with one or more traffic-management policies, as will be understood. Further, the DPI engine 406 may collect traffic statistics and store the statistics at the statistics storage unit 404.

The subscriber manager 402 may access the statistics storage unit 404 to retrieve statistics for informing of congestion detection and dynamic policy creation. Further, the subscriber manager 402 may provide user, location, and device awareness via analysis of signaling traffic that it taps or is replicated and tunneled to subscriber manager 402 by the DPI engine 406. By user, location, and device awareness, we mean that the IP address of a computing device 410 may be associated via various signaling with a user identity, with network elements that carry traffic exchanged with said computing device 410, and with the type of said computing device 410. For example, and as is further elucidated in FIG. 5, subscriber manager 402 may examine signaling exchanged with GGSN 408 to provide these associations with the IP address of computing device 410. In one embodiment, the subscriber manager 402 may have a script that is periodically invoked to pull statistics from the statistics storage unit 404. The subscriber manager 402 may subsequently analyze the statistics to identify one or more congested nodes and associated users (or subscribers), device types, and applications. In response to determining that one or more nodes are congested, the subscriber manager 402 may dynamically create or modify one or more policies (e.g., traffic-shaping or traffic-management rules) to mitigate congestion and push the policy changes to (i.e., provision the policies on) the DPI engine 406 for enforcement.

Figure 5:
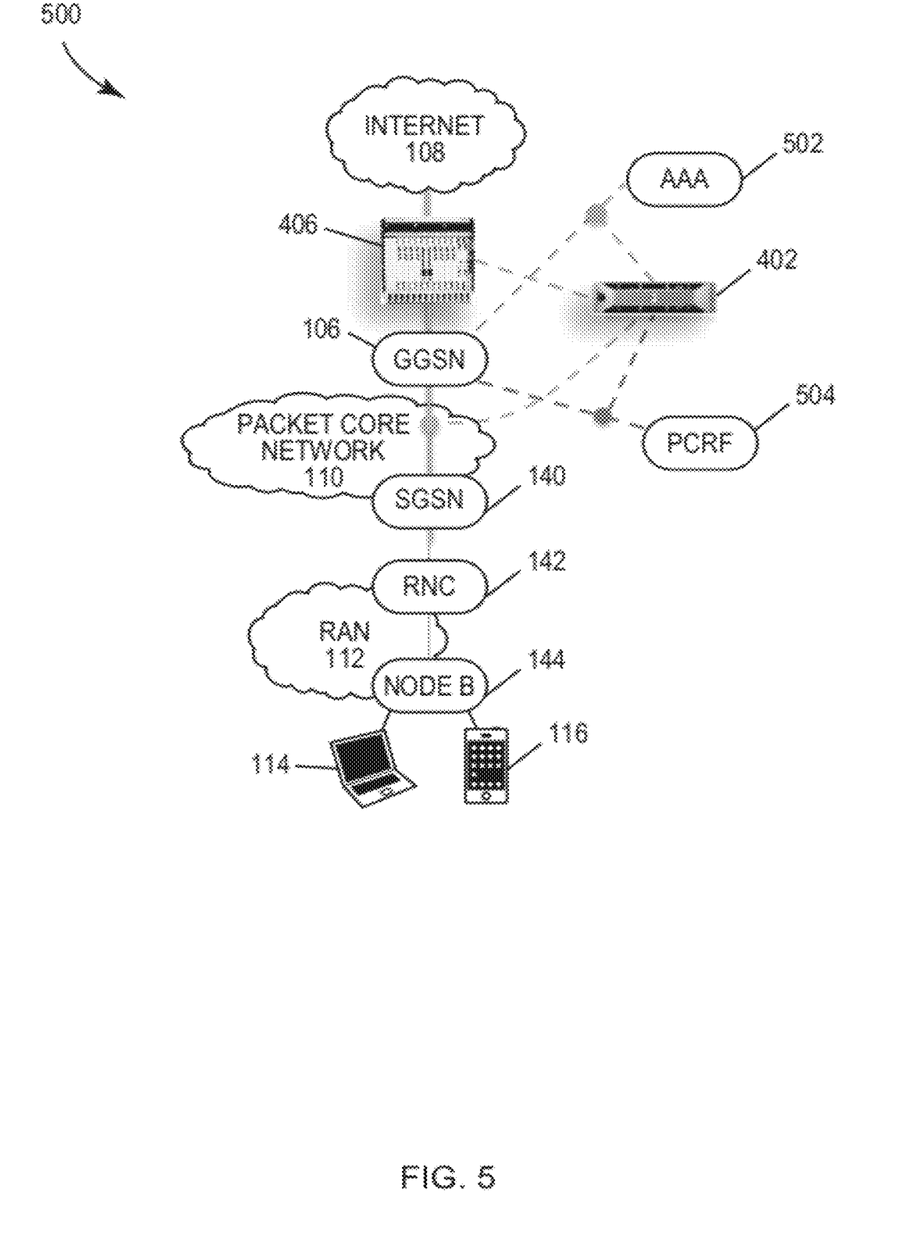
FIG. 5 is a block diagram of an example system 500 for tapping into GGSN signaling according to embodiments of the present disclosure.

FIG. 5 illustrates a block diagram of an example system 500 for tapping into GGSN signaling according to embodiments of the present disclosure. Referring to FIG. 5, the subscriber manager 402 and DPI engine 406 may be operable together for tapping signaling traffic exchanged by GGSN 106 with a network authentication, authorization, and accounting (AAA) component 502, a policy and charging rules function (PCRF) component 504, or a serving GPRS support node (SGSN). The AAA component 502 and the PCRF component 504 may each be suitably implemented within a server or other computing device. The GGSN may exchange RADIUS or Diameter signaling with AAA 502, Diameter signaling with PCRF 504, and/or GTP-C signaling with SGSN 140. Subscriber manager 402 may directly tap into this signaling, as depicted in FIG. 5. Alternatively, DPI engine 406 may detect such signaling, and tunnel a copy of the signaling to subscriber manager 402. By examining the constituent parts of this signaling, subscriber manager 402 may associate the IP addresses of computing devices 114 and 116 with respective user identities, with network nodes that carry traffic exchanged with said computing devices, and with the respective types of said computing devices. The signaling thus enables subscriber manager 402 to become user, location, and device aware, such that traffic-management policies (e.g., traffic-shaping or policing rules) may be dynamically provisioned that are specific to users, network nodes, or device types.

Detecting Nodal Congestion

Figure 6:
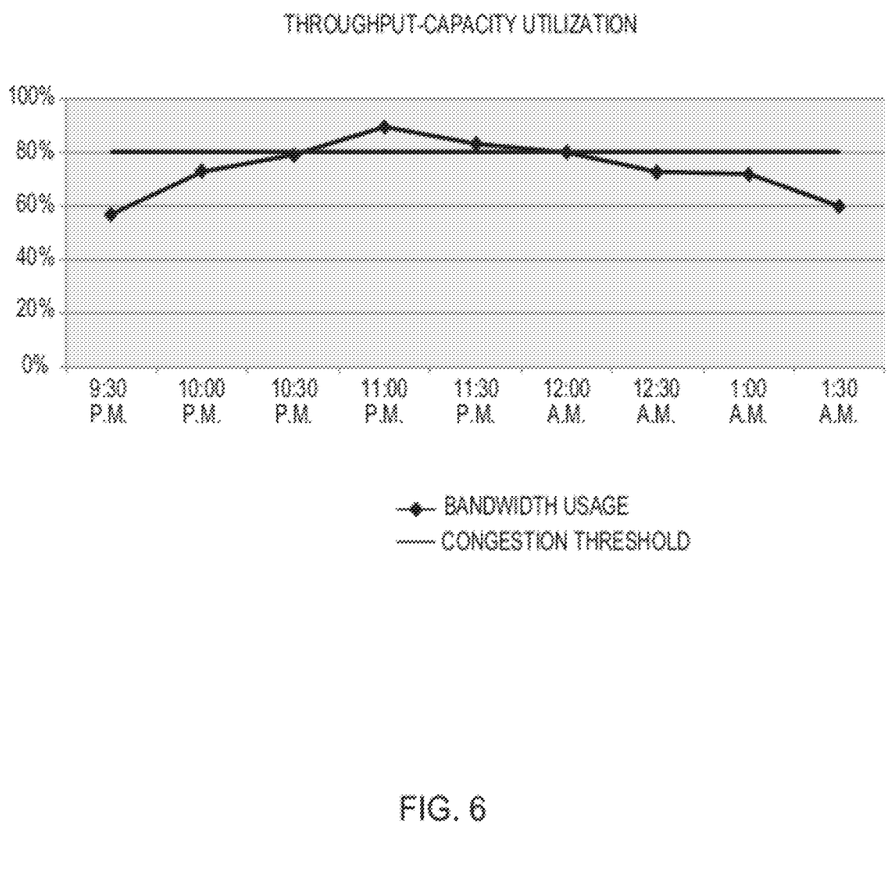
FIG. 6 is a graph showing throughput-capacity utilization over a period of time.

According to embodiments of the present disclosure, nodal congestion may be determined based on throughput- or link-capacity utilization. For example, FIG. 6 illustrates a graph showing nodal throughput-capacity utilization over a period of time. Referring to FIG. 6, a congestion threshold, sometimes corresponding to an engineering limit, is shown together with bandwidth usage. Congestion may be inferred when the bandwidth usage is measured to be above said predefined threshold. For example, with reference to FIG. 6, congestion may be detected at 11 p.m., when nodal throughput-capacity utilization exceeds the congestion threshold of 80%. Provisioned objects representing network nodes may have a throughput-capacity or link-capacity property. The objects may be provisioned for both downlink and uplink throughput or link capacities. As a result, throughput or link utilization may be assessed and reported relative to thresholds. A subscriber manager script, such as a script implemented by the subscriber manager 402 shown in FIG. 4, may periodically compare users' aggregate bandwidth versus the throughput capacity of a node serving them. Nodal congestion (or the cessation of such congestion) may be determined by use of the thresholds. System and method embodiments of the presently disclosed subject matter may employ throughput-capacity or link utilization and/or QoE metrics thresholds for determining nodal congestion.

Identifying Nodes as Targets for Dynamic Congestion Policies

Figure 7:
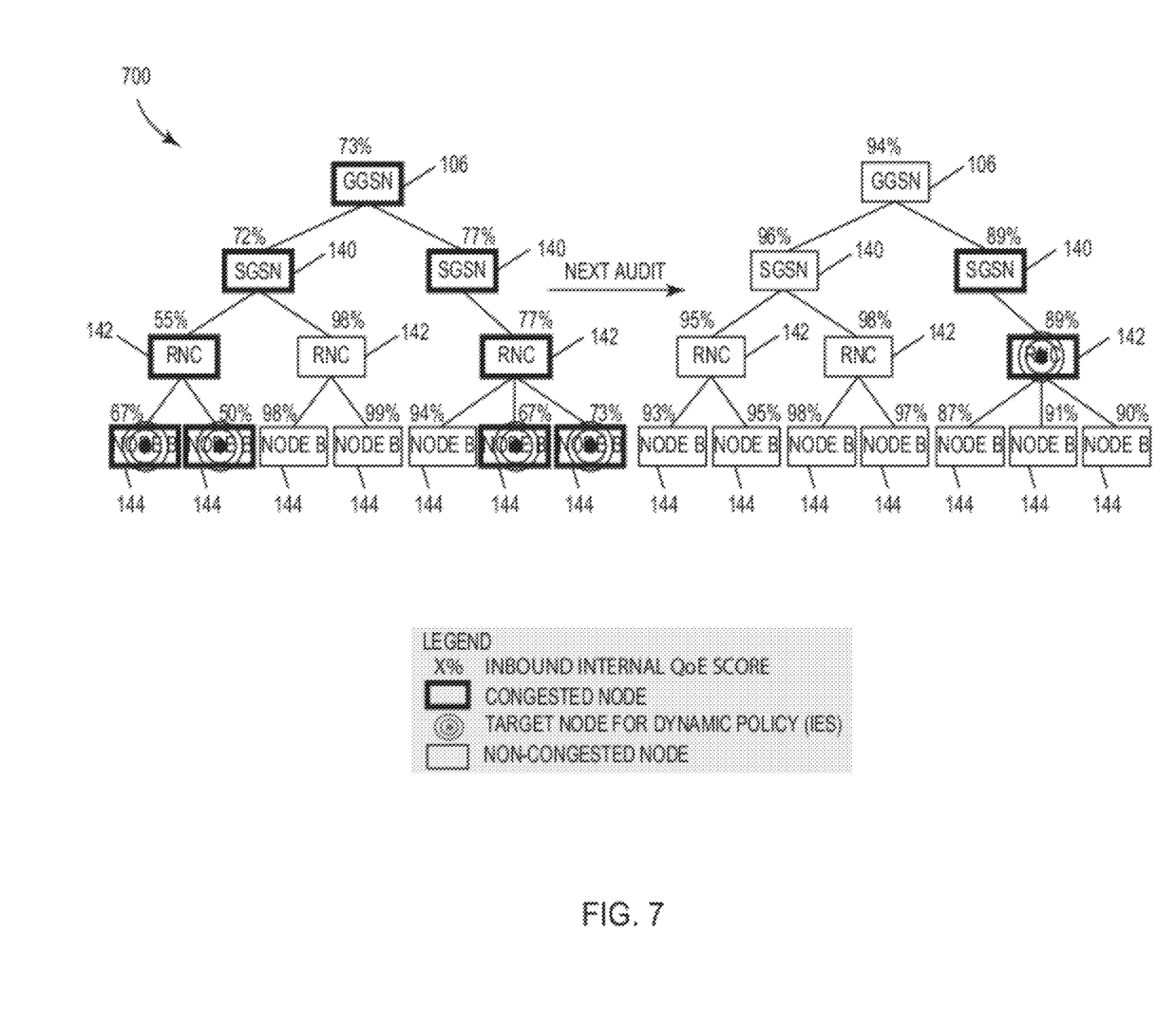
FIG. 7 is a block diagram of an example network hierarchy showing nodes identified as targets for dynamic congestion policies according to embodiments of the present disclosure.

FIG. 7 illustrates a block diagram of an example network hierarchy 700 showing nodes identified as targets for dynamic congestion policies according to embodiments of the present disclosure. The "circled" nodeBs 144 and RNC 142 indicate targeted nodes. Provisioned QoE-score and/or link-utilization thresholds indicating congestion may vary between levels in the network hierarchy. Higher level thresholds may be more stringent than lower level thresholds, because more traffic is at stake. With respect to two immediately connected nodes in the hierarchy, we refer to the node at the higher level as the parent node, and the node at the lower level as the child node. For example, each of depicted SGSNs 140 are children nodes with respect to a GGSN 106, but parent nodes with respect to subtending RNCs 142.

A goal in selecting target nodes for dynamic policy changes is to minimize the policy changes for nodes that are not experiencing congestion. Another goal is to judiciously and iteratively apply policy changes to both effectively manage congestion and impact a minimal subset of congested nodes. Thus, as depicted in FIG. 7, if a parent node is congested but has one or more congested children nodes to which congestion-management policies could be applied, then the children are candidates for dynamic policies rather than the parent node, since managing congestion at the children may concomitantly address congestion at the parent node. If a congested node has no congested child and congestion-management policies remain that could be applied to the congested node, then that node is targeted for policy changes.

Exceptions for which policies may be applied "globally" at a GGSN 106 include policies specific to "bandwidth abusive" users who are moving between congested cells. After determining that such users are moving between congested cells, policies specific to such users that are applied to nodes at lower levels in the network hierarchy may be replaced with a policy at the GGSN. (In this case, policies could also be applied to an RNC 142 or SGSN 140 that serves the set of congested cells.) Further, exceptions may be applied for roaming "bandwidth hogs" whose traffic is anchored at a congested GGSN 106, since the GGSN is the only node serving such users that is under the network operator's control and to which the operator can apply congestion-management policies.

It is also noted that a provisioned interval between periodic audits 302 should allow time for determining an effect of one or more implemented, dynamic, congestion-management policies. It is further noted that the provisioned interval between audits could be different before and after congestion is detected. Periodic audits enable iterative policy application in the management of congestion. Policies may be iteratively applied to both a given congested node and, as described above in connection with FIG. 7, congested nodes in a network hierarchy. Iteration may also be employed in the removal or disablement of congestion-management policies that have been applied to formerly congested nodes.

It is noted that FIG. 7 depicts only one example network applicable to the presently disclosed subject matter. However, the present subject matter may be applied to any suitable type of network as will be understood by those of skill in the art.

Gathering Data to Inform Dynamic Policies for Congested Nodes

Traffic statistics may provide nodal breakout data of bandwidth usage within a network hierarchy, identifying as well the users, applications and device types that are consuming bandwidth. Nodal uplink and downlink throughout- or link-capacities may be provisioned at subscriber manager 402, or subscriber manager 402 may obtain such capacities from a network management system (NMS).

Backing Out Dynamic Policy Changes

According to embodiments of the present disclosure, hysteresis techniques may be used to back out dynamic policy changes. Such techniques may minimize "ping-ponging" between congested and non-congested states. Hysteresis may be embodied in several exemplary forms. First, hysteresis techniques may include applying two thresholds to trigger entering and leaving congested state. A higher link-utilization or throughput-capacity threshold may be used to enter a nodal congested state, and a lower threshold used to leave the state. In contrast, a lower QoE-score threshold may be used to enter a nodal congested state, and a higher threshold used to exit this state. Second, dynamic policies may be maintained for multiple, consecutive audit intervals without congestion, before they are finally removed. Finally, and by way of example, a per-node stack of dynamic rule-set changes may be kept per audit. In this example, iteratively applied policy changes may be backed out in reverse order.

Figure 8:
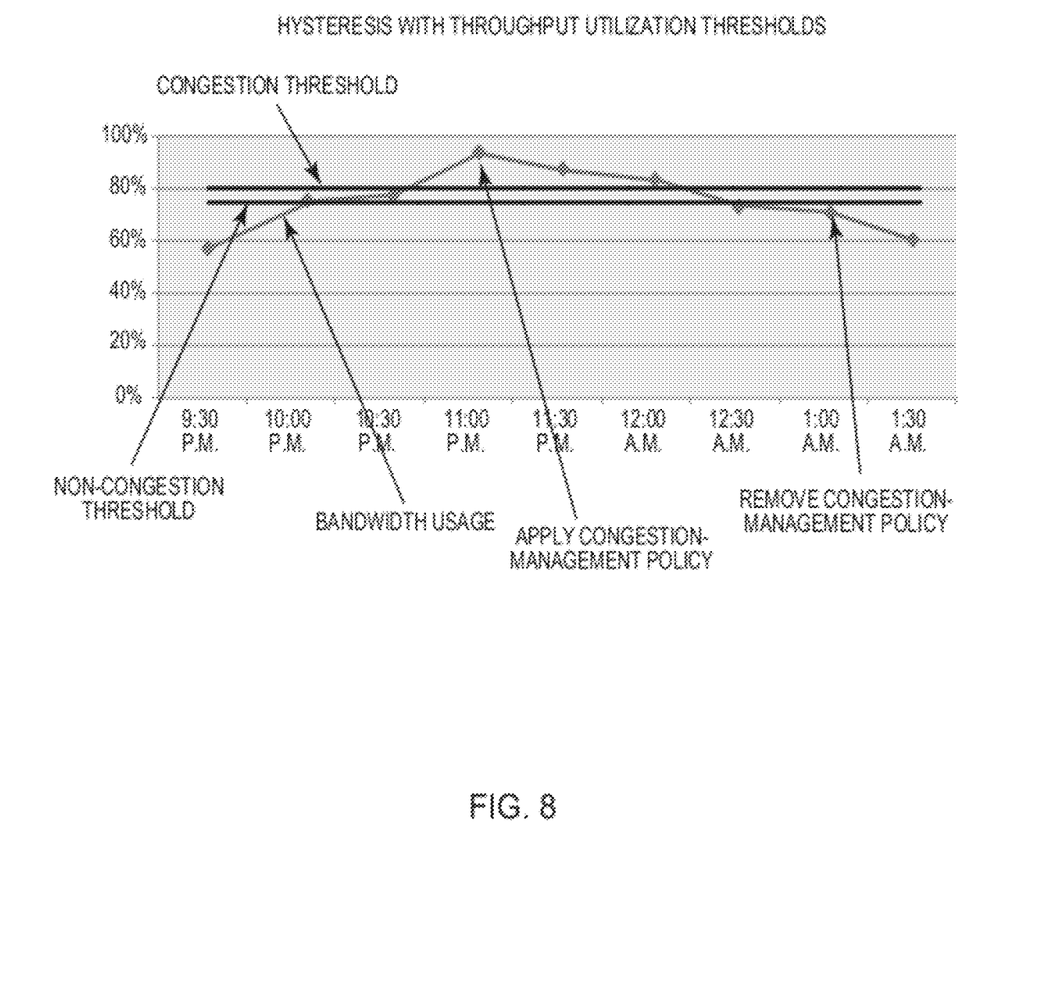
FIG. 8 is a graph showing an example of monitoring of throughput-capacity utilization instigating hysteresis techniques to back out a dynamic policy change according to embodiments of the present disclosure.

FIG. 8 illustrates a graph showing an example of nodal link utilization undergoing hysteresis techniques to back out a dynamic policy change according to embodiments of the present disclosure. Referring to FIG. 8, whereas congestion-management policy changes may be applied at 11 p.m. when nodal bandwidth exceeds a congestion threshold of 80%, such changes may be backed out at 1:00 a.m. (i.e., at the second-to-last diamond shape in "Bandwidth Usage"), after the second audit below the 75%, non-congestion threshold.

Tuning Congestion Management in the Network

In accordance with embodiments of the present disclosure, dynamic rule-set (i.e., congestion-management policy) changes may be logged to enable pattern analysis. Such logs, in conjunction with traffic statistics, may allow evaluation of the effectiveness of dynamic policies. Such pattern analysis and evaluation of policy effectiveness may be automated. The monitoring of logs and traffic statistics may be periodic, or aperiodic and triggered by a recent (or latest) congestion event in the network. The pattern may be a degenerate pattern of one set of at least one dynamically applied policy.

Persistent patterns of effective, dynamically installed policies may suggest the need to augment the baseline of statically provisioned policies. For example, if a dynamically installed policy is consistently applied to manage nodal congestion during the data busy hour, then the policy may be statically provisioned. Further, a time-of-day condition may be added to the policy. This allows policies to be enforced in real-time rather than during congestion audits.

Figure 9:
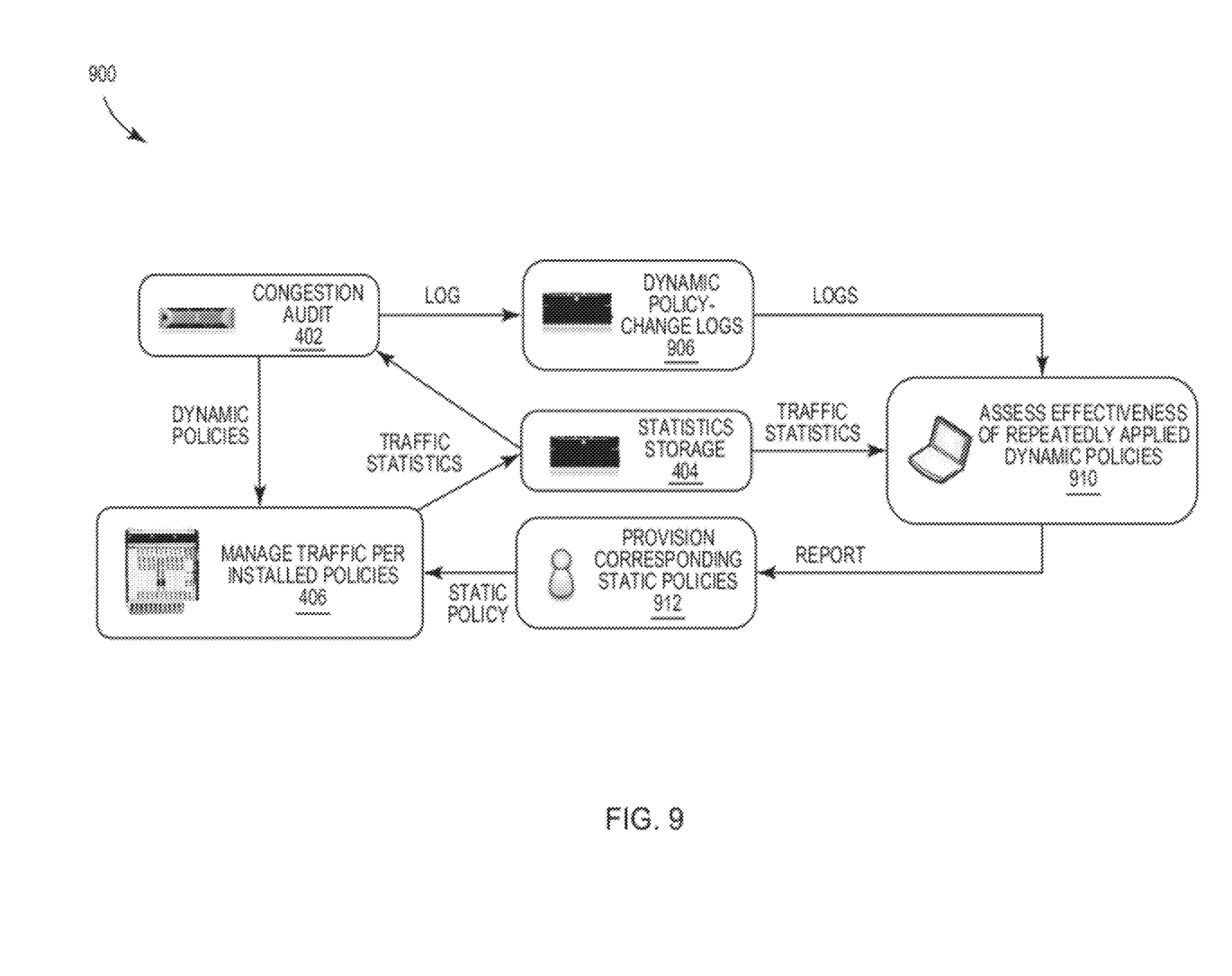
FIG. 9 is a block diagram of an example system for tuning policies according to embodiments of the present disclosure.

FIG. 9 illustrates a block diagram of an example system 900 for tuning statically provisioned, congestion-management policies according to embodiments of the present disclosure. Referring to FIG. 9, the system 900 may include: a congestion audit node 402, a system 406 for managing traffic per installed policies, a system 906 for storing dynamic policy-change logs, a traffic statistics storage system 404, and a system 910 for assessing effectiveness of repeatedly applied dynamic policies. In an example, static policies may be provisioned at one or more nodes at 912. The system 406 may manage traffic based on the statically and dynamically provisioned policies. The system 406 may report traffic statistics, before and after dynamic policies are applied and removed, to the statistics storage system 404 for storage. Using traffic statistics retrieved from statistics storage 404, congestion-audit node 402 may determine whether one or more nodes are congested, provision or remove/disable dynamic congestion-management policies on system 406 for enforcement, and log dynamic policy changes to the system 906. Assessment system 910, retrieving dynamic policy changes from logging storage 906 and traffic statistics from statistics storage 404, may detect patterns of dynamic policy changes, and assess the effectiveness of dynamic policies in managing congestion. Assessment system 910 may provide a report on its analysis, and the report may inform (manual or automated) deliberation on whether dynamically applied policies should have corresponding static policies provisioned on traffic-management system 406. Such static policies may be provisioned at 912.

As will be appreciated by one skilled in the art, aspects of the present subject matter may be embodied as a system, method or computer program product. Accordingly, aspects of the present subject matter may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present subject matter may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium (including, but not limited to, non-transitory computer readable storage media). A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present subject matter may be written in any combination of one or more programming languages, including an object oriented programming language such as Java, Smalltalk, C++ or the like and conventional procedural programming languages, such as the "C" programming language or similar programming languages, or assembly language that is specific to the instruction execution system. The program code may be compiled and the resulting object code executed entirely on the user's computer, partly on the user's computer, as a stand-alone software package, partly on the user's computer and partly on a remote computer or entirely on the remote computer or server. In the latter situation scenario, the remote computer may be connected to the user's computer through any type of network, including a local area network (LAN) or a wide area network (WAN), or the connection may be made to an external computer (for example, through the Internet using an Internet Service Provider).

Aspects of the present subject matter are described below with reference to flowchart illustrations and/or block diagrams of methods, apparatus (systems) and computer program products according to embodiments of the subject matter. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present subject matter. In this regard, each block in the flowchart or block diagrams may represent a module, segment, or portion of code, which comprises one or more executable instructions for implementing the specified logical function(s). It should also be noted, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the subject matter. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or steps plus function elements in the claims below are intended to include any structure, material, or act for performing the function in combination with other claimed elements as specifically claimed. The description of the present subject matter has been presented for purposes of illustration and description, but is not intended to be exhaustive or limited to the subject matter in the form disclosed. Many modifications and variations will be apparent to those of ordinary skill in the art without departing from the scope and spirit of the subject matter. The embodiment was chosen and described in order to best explain the principles of the presently disclosed subject matter and the practical application, and to enable others of ordinary skill in the art to understand the presently disclosed subject matter for various embodiments with various modifications as are suited to the particular use contemplated.

The descriptions of the various embodiments of the present subject matter have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed:

1. A method for dynamic congestion management in a communications network, the method comprising:
   determining traffic statistics of at least one node in a communications network;
   determining whether the at least one node is congested based on the traffic statistics;
   in response to determining that the at least one node is congested, dynamically changing or provisioning a set of at least one traffic shaping rule for application to the at least one node;
   in response to determining that the at least one node is congested, determining whether the at least one node does not have a congested child node; and
   in response to determining that the congested at least one node does not have a congested child node, applying the traffic shaping rule to the congested at least one node.

2. The method of claim 1, further comprising backing out a last dynamic rule-set change or provisioning in response to determining that the at least one node is not congested.

3. The method of claim 1, further comprising automatically implementing each of the steps.

4. The method of claim 1, wherein the steps are periodically implemented.

5. The method of claim 1, wherein the steps are iteratively implemented.

6. The method of claim 1, further comprising logging the change or provisioning of the set of at least one traffic shaping rule.

7. The method of claim 6, further comprising using the logged change or provisioning of the set of at least one traffic shaping rule to tune congestion management in the communications network.

8. The method of claim 7, wherein using the logged change or provisioning comprises assessing at least one of persistent patterns and effectiveness of congestion management resulting from dynamic changes to traffic shaping rules, in order to inform any provisioning of static rules.

9. The method of claim 1, further comprising implementing a statically provisioned traffic shaping policy for the at least one node.

10. The method of claim 1, wherein determining whether the at least one node is congested comprises using one or both of a Quality of Experience (QoE) score and a throughput-capacity utilization threshold of the at least one node to determine congestion.

11. The method of claim 1, further comprising:
    in response to determining that the at least one node is congested, determining whether the at least one node has a congested child node; and
    in response to determining that the congested at least one node has a congested child node, applying the dynamic traffic shaping rule to the child node.

12. The method of claim 1, wherein changing or provisioning a traffic shaping rule comprises using a usage fairness technique.

13. The method of claim 1, wherein the communications network is a mobile network, wherein the method further comprises:
    determining whether a user served by the at least one node uses a disproportionate share of bandwidth compared to other users and has moved between congested cells; and
    in response to determining that the user served by the at least one node uses a disproportionate share of bandwidth and has moved between congested cells, provisioning a set of at least one global traffic shaping rule for application to the user.

14. A system for dynamic congestion management in a communications network, the system comprising:
    at least a processor and memory configured to:
    determine traffic statistics of at least one node in a communications network;
    determine whether the at least one node is congested based on the traffic statistics;
    dynamically change or provision a set of at least one traffic shaping rule for application to the at least one node in response to determining that the at least one node is congested;
    in response to determining that the at least one node is congested, determining whether the at least one node does not have a congested child node; and
    in response to determining that the congested at least one node does not have a congested child node, applying the traffic shaping rule to the congested at least one node.

15. The system of claim 14, wherein the at least a processor and memory are configured to backout a last dynamic rule-set change or provisioning in response to determining that the at least one node is not congested.

16. The system of claim 14, wherein the at least a processor and memory arc configured to automatically determine traffic statistics, determine whether the at least one node is congested, and dynamically change or provision the set of at least one traffic shaping rule.

17. The system of claim 14, wherein the at least a processor and memory are configured to periodically determine traffic statistics, determine whether the at least one node is congested, and dynamically change or provision the set of at least one traffic shaping rule.

18. The system of claim 14, wherein the at least a processor and memory are configured to iteratively determine traffic statistics, determine whether the at least one node is congested, and dynamically change or provision the set of at least one traffic shaping rule.

19. The system of claim 14, wherein the at least a processor and memory are configured to log the change or provisioning of the set of at least one traffic shaping rule.

20. The system of claim 19, wherein the at least a processor and memory are configured to use the logged change or provisioning of the set of at least one traffic shaping rule to tune congestion management in the communications network.

21. The system of claim 20, wherein using the logged change or provisioning comprises assessing at least one of persistent patterns and effectiveness of congestion management resulting from dynamic changes to traffic shaping rules, in order to inform any provisioning of static rules.

22. The system of claim 14, further comprising implementing a statically provisioned traffic shaping policy for the at least one node.

23. The system of claim 14, wherein determining whether the at least one node is congested comprises using one or both of a Quality of Experience (QoE) score and a throughput-capacity utilization threshold of the at least one node to determine congestion.

24. The system of claim 14, further comprising:
in response to determining that the at least one node is congested, determining whether the at least one node has a congested child node; and
in response to determining that the congested at least one node has a congested child node, applying the dynamic traffic shaping rule to the child node.

25. The system of claim 14, wherein changing or provisioning a traffic shaping rule comprises using a usage fairness technique.

26. The system of claim 14, wherein the communications network is a mobile network,
wherein the method further comprises:
determining whether a user served by the at least one node uses a disproportionate share of bandwidth compared to other users and has moved between congested cells; and
in response to determining that the user served by the at least one node uses a disproportionate share of bandwidth and has moved between congested cells, provisioning a set of at least one global traffic shaping rule for application to the user.

27. A computer program product for dynamic congestion management in a communications network, the computer program product comprising:
a non-transitory computer readable storage medium having computer readable program code for execution by a processor, the computer readable program code comprising:
computer readable program code configured to determine traffic statistics of at least one node in a communications network;
computer readable program code configured to determine whether the at least one node is congested based on the traffic statistics; and
computer readable program code configured to dynamically change or provision a set of at least one traffic shaping rule for application to the at least one node in response to determining that the at least one node is congested;
computer readable program code configured to, in response to determining that the at least one node is congested, determining whether the at least one node has does not have a congested child node; and
computer readable program code configured to, in response to determining that the congested at least one node does not have a congested child node, applying the dynamic traffic shaping rule to the congested at least one node.

28. The computer program product of claim 27, further comprising:
computer readable program code configured to determine whether a user served by the at least one node uses a disproportionate share of bandwidth compared to other users and has moved between congested cells; and
computer readable program code configured to, in response to determining that the user served by the at least one node uses a disproportionate share of bandwidth and has moved between congested cells, provision a set of at least one global traffic shaping rule for application to the user.

* * * * *